(12) United States Patent
Klein et al.

(10) Patent No.: US 8,843,570 B2
(45) Date of Patent: Sep. 23, 2014

(54) METHOD OF ENABLING A SERVICE AT A COMMUNICATION NETWORK NODE

(75) Inventors: Mikael Klein, Huddinge (SE); Christer Boberg, Tungelsta (SE); David Cox, Melbourne (AU); Sofie Lassborn, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 767 days.

(21) Appl. No.: 12/867,934

(22) PCT Filed: Feb. 18, 2008

(86) PCT No.: PCT/SE2008/050188
§ 371 (c)(1),
(2), (4) Date: Aug. 17, 2010

(87) PCT Pub. No.: WO2009/104998
PCT Pub. Date: Aug. 27, 2009

(65) Prior Publication Data
US 2010/0317330 A1    Dec. 16, 2010

(51) Int. Cl.
*G06F 15/16* (2006.01)
*G06Q 99/00* (2006.01)

(52) U.S. Cl.
CPC ..................... *G06Q 99/00* (2013.01)
USPC ........................................ 709/206

(58) Field of Classification Search
CPC ..................................... G06Q 99/00
USPC ........................................ 709/206
See application file for complete search history.

(56) References Cited

U.S. PATENT DOCUMENTS

| 6,754,665 | B1 | 6/2004 | Futagami et al. |
| 7,451,922 | B2 * | 11/2008 | Daigle et al. ................ 235/380 |
| 7,596,605 | B2 * | 9/2009 | Sung et al. .................. 709/206 |
| 2003/0047613 | A1 | 3/2003 | Funamoto et al. |
| 2003/0110264 | A1 | 6/2003 | Whidby et al. |
| 2006/0280166 | A1 | 12/2006 | Morris |
| 2006/0282500 | A1 | 12/2006 | Kiuchi et al. |
| 2007/0130260 | A1 | 6/2007 | Weintraub et al. |
| 2010/0088105 | A1 * | 4/2010 | Feldhahn ..................... 705/1.1 |
| 2010/0317330 | A1 * | 12/2010 | Klein et al. ................ 455/414.1 |
| 2011/0127326 | A1 * | 6/2011 | Daigle et al. ................ 235/380 |
| 2013/0008970 | A1 * | 1/2013 | Daigle et al. ................ 235/492 |

FOREIGN PATENT DOCUMENTS

| EP | 1587239 A1 | 10/2005 |
| EP | 1855444 A1 | 5/2006 |
| JP | 2002-366572 A | 12/2002 |
| JP | A 2005-346251 | 12/2005 |

(Continued)

*Primary Examiner* — Jerry Dennison

(57) ABSTRACT

A method enabling a service at a communication network node and a network node adapted to execute the method is provided, wherein a first request, requesting for one or more operations to be associated with a symbol, is received from a first user. The request comprises an instruction, identifying one or more operations. The request triggers the generating of a unique symbol identity, and the creation of a symbol record, associated with the symbol identity, wherein the symbol record, linking the symbol identity to the one or more operations. At the node the symbol identity is also associated with the generated symbol, which is created by a symbol server and forwarded to the first user. Once the symbol has been received by the node in a second request, the symbol identity corresponding to the symbol is retrieved from the symbol server, and the service is enabled by executing the one or more operations according to the symbol record identified by the symbol identity.

26 Claims, 4 Drawing Sheets

(56) References Cited

FOREIGN PATENT DOCUMENTS

| | | | |
|---|---|---|---|
| JP | 2006-03978 | A | 2/2006 |
| JP | 2006-228026 | A | 8/2006 |
| JP | 2007-206740 | A | 8/2007 |
| KR | 20030095500 | A | 12/2003 |

\* cited by examiner

METHOD OF ENABLING A SERVICE AT A COMMUNICATION NETWORK NODE

TECHNICAL FIELD

The present invention relates generally to a method for defining and triggering a service, and more specifically for enabling a service which has been associated with a unique symbol at a communication network node.

BACKGROUND

Today information exchange has become a natural part of the daily routines for parties active in a majority of professions. Such information exchange may range from physically typing information retrieved from an information carrier into some storage means, to exchanging information between entities, often relying on a user interaction from one or more parties participating in the information exchange process.

Exchanging business cards is a well established custom for exchanging personal information between business associates, as well as during different occasions whenever two individuals are making any kind of new acquaintances.

A classical approach to an exchange of business card information, typically following the conventional vCard standard, is that a user receives a paper based business card and manually enters the information printed on the card, such as e.g. telephone number, e-mail and mail address, into his or her User Equipment, such as e.g. a PDA or a cellular telephone. Another way of exchanging business card information is to attach the business card information into an SMS, MMS or an e-mail which is then transmitted between the two parties, or to use a Bluetooth or an Infrared connection for exchanging the business card information.

Today there is, however, few simple ways to update an address book without requiring a tedious number of interactions of sourcing an already established address book of a different format, often requiring adaptation and modification to achieve compatibility.

In addition, there is no way of "leaving this kind of information behind", enabling other users to easily retrieve the information, or even updated information, at a later occasion.

Manual insertion of business card information into a User Equipment is often regarded to be a time consuming process, with a considerable risk for misspelling. In addition, existing technique used for exchanging business card information is also often considered quite complicated to handle by the ordinary user since commonly known information exchanging procedures often require interactions from both the transmitting and the receiving party.

Another way of exchanging information between users may be provided via the Presence service. Presence service offers an extensive mechanism for customizing a service for information delivery according to the users needs and preferences.

FIG. 1 is a schematic illustration of a Presence System, according to the prior art, which is operating in accordance with well known SIP/IMS standards.

A Watcher 100, i.e. a user provided with a User Equipment enabled to access presence services from a Presence System 101, defined by the entities located within the dotted square, may request for presence information of a Presentity 102, i.e. another user, which has also activated a presence service, enabling authorized Watchers to access information associated with the Presentity 102. The Watcher 100, requesting for presence information of Presentity 102 communicates with the Presence System 101, via an Application Server, or a Presence Server 103.

In response to a request received from Watcher 100, the Presence Server 103 interrogates a Presence XML Document Server (Presence XDMS) 104, in order to determine whether Watcher 100 has been authorized to see the presence information of Presentity 102, Updated presence Information may be provided to Presence Server 103 from different Presence Sources 105, such as e.g. a Location Server or an Address Book Server. Presence server 103 may accept presence information, which has been published to it, and distribute it to authorized Watchers as notifications.

A Presence System typically also includes a Resource List Server (RLS) 106, which compiles presence subscriptions in lists. These lists are then stored in an RLS XDMS 107, from where they are accessible for the Presence Server 103.

A standard way for a Presentity to publish presence information about oneself is to send a request, typically a SIP PUBLISH request, to a Presence Server, or an XCAP PUT request to a Presence XDMS. Normally the network can also publish presence information for a user, but such a presence delivery mechanism does, however, not involve a performance of an event triggered by the Presentity.

Publishing of presence information may require a lot of effort from the user, including tasks, such as e.g. typing and/or selecting options, all of which may have a restraining effect on the amount of presence information that is actually being published.

One standard way for a user, typically referred to as a Watcher, to add a buddy, typically referred to as a Presentity, to its list of presence enabled buddies is to send a request, typically in the form of an XCAP PUT request, to an RLS XDMS and/or to a Shared XDMS (not shown). The Presence System will then subscribe for information related to the Presentity on behalf of the Watcher, receiving notifications that are then conveyed to the Watcher.

Today there is no straightforward and simple way to automatically add a buddy to the list of presence enabled users via a User Equipment. Methods for adding such information today requires that the address information of each buddy to be added has to be manually entered into the user equipment. Addresses usually are quite long, and, thus, the risk of misspelling may be considerable, which in turn may lead to a less frequently utilization of this type of services, compared to what could have been the case with a more user friendly mechanism for defining the service and/or for executing the service.

SUMMARY

It is an object of the present invention to address at least some of the problems outlined above. Further, it is an object of the present invention to provide a method which enables a user to trigger the execution of a service, which has been previously defined by one or more operations, simply by registering and forwarding a symbol to a service enabling node. Generally, the method refers to a mechanism which allows a user to define a service, which will be represented by a unique symbol, and the same or another user to trigger the service in a user friendly way, identifying the service with the unique symbol. These objects and others may be obtained by a method and a communication network node adapted to perform the method according to the attached independent claims.

According to one aspect, a method is provided for enabling a service at a communication network node. In response to receiving a first request from a first user, requesting for one or more operations to be associated with a symbol, a unique symbol identity is generated at the node. The request comprises an instruction, identifying the one or more operations. A symbol record associated with the symbol identity is also created, wherein the symbol record is linking the symbol identity to the one or more operations. The symbol identity is then associated with the symbol, which is created by a symbol server and forwarded by the node to the first user, which may store the symbol and/or reproduce it so that it can be displayed for a potential user.

Once the symbol is received by the node in a second request, the symbol identity corresponding to the received symbol is retrieved from the symbol server, and the service is enabled by executing the one or more operations according to the symbol record, identified by the symbol identity. The initiator of the second request, triggering the service, may be identical to the first user or another user.

The instruction, identifying the one or more operations which will enable the required service is typically the result of an interaction between an application of the node and a user equipment of the first user. Such an interaction may be achieved, e.g. via a WEB server.

The triggering of the defined service, may involve transmitting the second request e.g. via MMS, SMS, or via a SIP/IMS based protocol.

The services may comprise both presence and non-presence related services, and more particularly, services such as, e.g. services handling a buddy list, presence updating, publications and/or notifications and/or distribution of electronic business cards, may be defined and used by users, provided with a conventional communication User Equipment, provided with a conventional code or symbol registering means, such as, e.g. a code reader, a scanner or a camera.

The claimed invention also refers to a communication network node adapted to perform the method described above.

A method and a communication network node operating according to the principles of the described method may simplify the process of introducing and using new services.

The described method relies on the use of standardised User Equipments and transmission protocols in combination with a new communication network node.

The features and benefits of the present invention will become apparent from the detailed description below.

BRIEF DESCRIPTION OF THE DRAWINGS

The present invention will now be described in more detail by means of exemplary embodiments and with reference to the accompanying drawings, in which.

DETAILED DESCRIPTION

Briefly described, the present invention refers to a user friendly method enabling a user to trigger a service, which has been previously defined by another or the same user. The service is triggered by registering a symbol, which has previously been defined to represent the respective service, and by forwarding the registered symbol to an Application Server, adapted to provide the service by executing the operation/s associated with the service, accordingly.

Such a method may be initiated by a user accessing an application of the Application Server, which enables the user to define a service, i.e. a conditional or unconditional execution of one or more operations, which will be managed by the Application Server. The defined service is then associated with a unique symbol, which is created by a conventional Symbol Server upon request from the Application Server. The Application Server also creates a unique symbol identity, which will be associated with the created symbol and a symbol record, comprising the symbol identity and the associated one or more operations.

By reproducing and displaying the created symbol, either the user mentioned above, i.e. the initiator, or administrator of the symbol associated service, or another user, may choose to trigger the execution of the one or more operations associated with the symbol, simply by registering the symbol, using a conventional User Equipment provided with a conventional registering means, and by forwarding the symbol to the Application Server. Once the symbol has been decoded by the Symbol Server, the Application Server performs the predefined service, accordingly.

Figure 2:
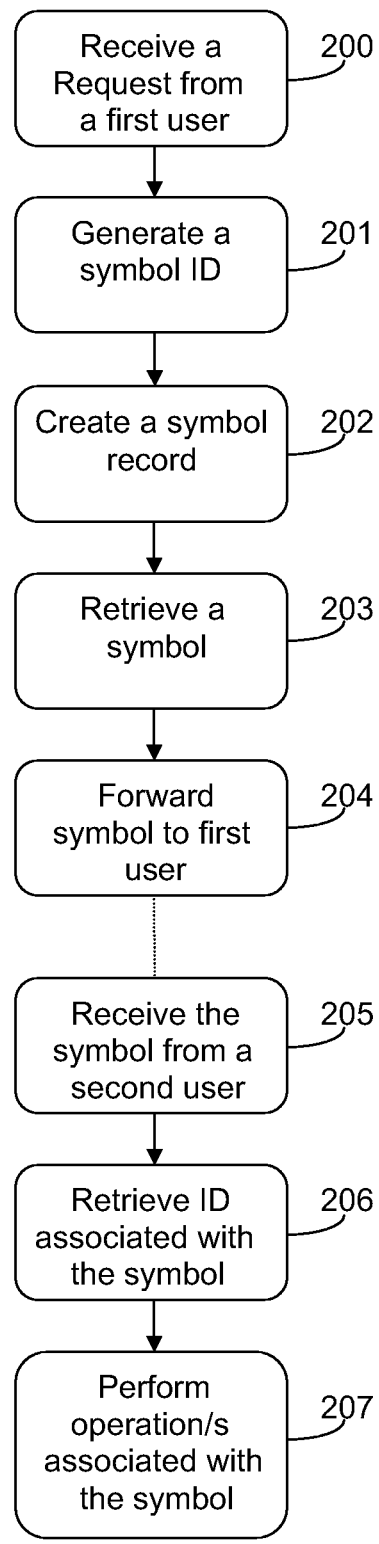
FIG. 2 is a flow chart illustrating a method of defining and triggering a service associated with a symbol, according to one embodiment.

A general description of a method for defining and triggering a service associated with a symbol, according to one embodiment will now be described with reference to the flow chart of FIG. 2.

In a first step 200, a request transmitted from a first user, requesting for one or more operations to be associated with a symbol, is received by an Application Server. The request comprises an instruction, identifying one or more operations, representing an executable service which is to be associated with a symbol. The request typically also comprises of an identity, identifying the first user as the administrator or in initiator of the symbol triggered service. The user identity, which from now on will be referred to as the administrator identity (adm ID) may be any of e.g. a SIP URI, a TEL URI or a PRES URI.

Typically, the instruction is the result of an interaction established between the User Equipment of the first user and an application of the Application Server, wherein the first user may have accessed the application, e.g. via a Web Server and a Graphical User Interface (GUI), according to any known standard procedures. This functionality will therefore not be described in any further detail in this document.

A web service provided by the Web Server may typically be configured to enable the user to define a service, using a list of user readable commands, which when interpreted by the Web service results in the execution of the required service, i.e. the Web service interprets each user readable command, entered by the user, into Application Server commands, which corresponds to one or more specific operations, executable by the Application Server. Such an interpreting tool, as well as a function for defining commands as described above, may also be implemented into the suggested concept using conventional technique. For this reason, also further explanations of these functions will be omitted in this document.

In a typical scenario the Application Server receiving the instruction will be able to code the commands of the received instruction into corresponding Application Server commands which are adapted for the system set to perform the required operation/s. A user command entered via a GUI may e.g. have the form of: "This symbol is to add me to the contact list of user X", in case the intention of user X is to allow other users to be added to his/her contact list in a user friendly way. A frequently occurring service, such as e.g. a user wanting other users to become aware of that the user is being away for lunch may instead enter a user command which reads: "This symbol is to update my presence as being at lunch". Commands may also be set to have a time-out condition, wherein one or more operations may be set to be executed only when a predetermined time instance has elapsed, e.g. presence may automatically be set to change from "being at lunch" to "being present" after 1 hour.

Once a service, represented by one or more operations, has been defined at the Application Server, the Application Server generates a unique symbol identity (symbol ID), as indicated with a step 201. The symbol identity will be associated with the defined service. At a next step 202, the Application Server creates a symbol record comprising: the adm ID, identifying the initiator/administrator of the service; the symbol ID, and the associated one or more operations which corresponds to the commands entered by the administrator.

At another step 203, the Application Server requests for a symbol to be associated with the recently created symbol ID, and the associated operation/s, from a Symbol Server. The Symbol Server, which typically is a convention Symbol Server, uses the symbol ID to create a unique symbol according to conventional coding procedures and returns the created symbol to the Application Server in response to the request. The symbol may be of any known type, such as e.g. a bar code, a colour code or a QR-code.

The Symbol Server may be connected to the Application Server as a stand alone unit or configured as one single unit which is integrated with the Application Server.

In a next step 204, the Application Server, recognising that a symbol has been defined for the service, forwards the symbol received from the Symbol Server to the first user, while failure to forward a symbol may result in an error code being sent to the first user.

Once a service, executable by running one or more identified operations, have been defined by the first user, and once an associated symbol and a symbol record has been created accordingly, the symbol may be used by the same user or any other user as a trigger of the respective service. In order for anyone to use the symbol for the mentioned triggering purpose, the symbol has to be made available. This may be done by reproducing it, e.g. by printing out the symbol, using any type of conventional printing means, and by putting up the printed symbol on display on a strategic place or location, like e.g. on a bag, on a business card, on an invitation to a meeting or a conference, on an office door, on an entrance to a shop or to a sports arena or to any other public facility.

Alternatively, the symbol received by a User Equipment of the first user may be stored in the memory of the User Equipment. Once stored, the symbol may be brought up on the display or monitor of the User Equipment later on, for another user to register and forward the symbol to the Application Server, thereby triggering the respective symbol associated service. The symbol stored at a User Equipment may also be transmitted to yet another user, which can choose to publish the symbol for registration.

In a subsequent step 205, which may occur at any time subsequent to having made the created symbol available to potential users, the Application Server receives the symbol from a second user, or the first user, which have registered the previously created symbol with a conventional registering means, such as e.g. a code reader, a scanner or a camera.

In another step 206, the Application Server automatically retrieves the symbol ID associated with the symbol from the Symbol Server, utilising conventional Symbol Server decoding standards, and, based on this information, the Application Server retrieves the respective symbol record and performs the one or more operations associated with the registered symbol, as indicated with a final step 207.

The initial steps of the method suggested above, i.e. the steps describing how an executable service, to be associated with a unique symbol, may be defined, according to one embodiment, will now be described in further detail with reference to the signalling diagram of FIG. 3.

In a first step 3:1 a user, User A 300 defines a service which is to be associated with a unique symbol. User A is here defined as a user provided with a portable or stationary User Equipment, such as e.g. a PC, a laptop, or a cellular telephone. Such a procedure is typically achieved by interacting with an Application Server 301, as described above.

In a next step 3:2, a request to associate the defined service with a unique symbol is transmitted to the Application Server 301, forming a terminating step of the interaction procedure of step 3:1. The request comprises an instruction, instructing the Application Server how to execute the service, defined by User A, i.e. the one or more operations required to perform the defined service accordingly. The request typically also comprises a user identity, identifying User A 300 as the creator/administrator of the service. Steps 3:1 and 3:2 are typically provided via a Web Server 303, or another conventional server, providing access to an application of the Application Server 301, via a suitable GUI.

The Application Server 301, receiving the request from user A 300, generates a unique symbol ID in a next step 3:3. In a subsequent step 3:4 the Application Server 301 generates a symbol record, comprising the symbol ID, the associated operational steps, and adm ID, identifying user A. In another step 3:5, the Application Server 301 requests for a unique symbol, to be associated with the recently created symbol ID, from a conventional Symbol Server 302. At the Symbol Server 302, a symbol is created in a step 3:6, and in a next step 3:7, the symbol is delivered to the Application Server 301.

The Application Server 301, having received a symbol from the Symbol Server, forwards the symbol to user A 300 in another step 3:8. Once received by User A 300, the symbol may be stored, for later registration, according to any of the alternatives suggested above, and/or displayed instantly. This is illustrated with the step 3:9, terminating the service defining stage.

User A 300, having received the symbol representing the required service, may now choose to reproduce the symbol, with or without an instruction explaining the service in plain text. An explanation may be achieved by accessing the Application Server via a web page, in resemblance to the procedure described for the definition of the symbol triggered service. In a typical scenario, such explaining text was chosen already in the service defining stage of step 3:1 and 3:2.

In an alternative embodiment, the User Equipment of User A, may be equipped with means for generating a symbol, such as e.g. a QR-code. In such a case the Symbol Server functionality will be integrated with the User Equipment of User A, and, thus the procedure executed in steps 3:5-3:7 will instead be the result of an integration between User A 300 and the Application Server 301.

Figure 4:
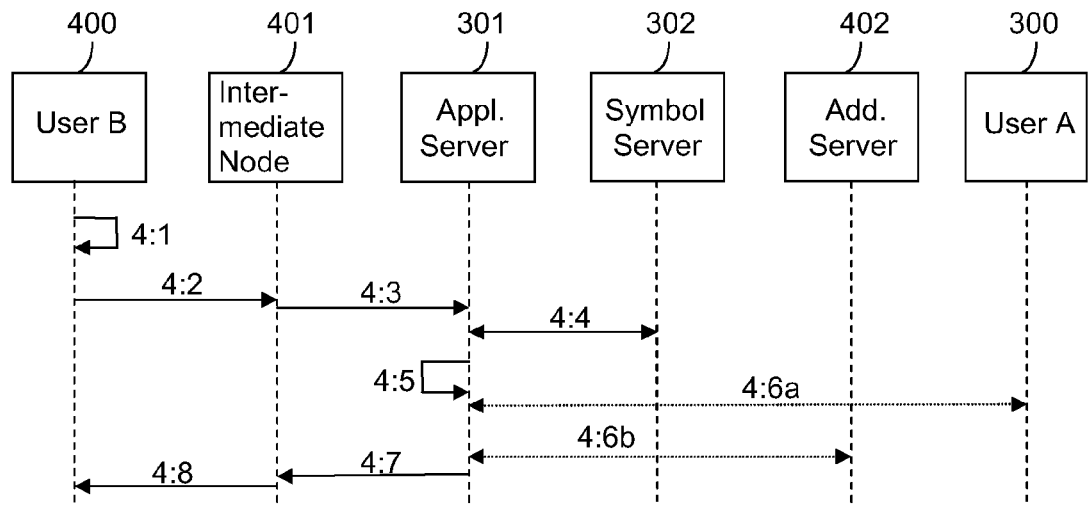
FIG. 4 is a signalling diagram illustrating how a service associated with a symbol may be triggered by a user, according to one embodiment.

FIG. 4 is another signalling diagram, illustrating the continuing steps of the suggested method, describing how User A, or another user may trigger the respective service in an automated and user friendly way, according to one exemplary embodiment.

In a first step 4:1, a User B 400 registers the symbol, which was previously created by user A in step 3:1 above. Also user B is referred to as a user provided with a conventional User Equipment, such as e.g. a PC, a cellular telephone, a PDA, a laptop, or any other type of stationary or portable equipment, provided with at least one conventional registering means, such as e.g. a scanner, a code reader or a camera.

In two subsequent steps 4:2 and 4:3, User B 400 sends the registered symbol, together with a user identity, identifying User B, to Application Server 301 in a second request, via an appropriate network, requesting the Application Server 301 to trigger the service associated with the symbol.

According to one embodiment, wherein IMS capabilities are required, the symbol may be transferred to the Application Server 301 using SIP/IMS standards. In such a case the Intermediate Node 401, of FIG. 4 is represented by a conventional Access Node, i.e. an I-CSCF, of a SIP/IMS network.

According to another embodiment, adapted to handle User Equipments which have no IMS capabilities, the User Equipment may be provided with decoding means, adapted to decode a registered symbol. In such a case, the decoded data may be sent to the Application Server 301, e.g. via SMS, and, thus, the Intermediate Node 401, is a Short Message Service Centre (SMS-C).

According to yet another embodiment, the symbol may instead be transmitted via MMS, wherein the Intermediate Node 401 is instead a Multimedia Messaging Service Centre (MMS-C). In both the SMS and the MMS case mentioned above, triggering may be achieved simply by dialling a telephone number provided by the described service, using the established connection to transfer the symbol to the Application Server.

Triggering of a specific service simply by registering a symbol and transmitting it to a server via a telephone call may simplify the daily use of a lot of services, which presently require one or more, more or less complicated steps to be taken by the user, each of which may involve a risk of failing to complete a required interaction correctly, thereby risking to fail to complete the respective service correctly.

In a next step 4:4 the symbol ID, associated with the transmitted symbol is retrieved from Symbol Server 302. On the basis of the retrieved symbol ID, the Application Server 301 will be able to locate the corresponding symbol record and to trigger the service, specified by the one or more operations, associated with the respective symbol and symbol ID. This is illustrated with another step 4:5. Typically, the Application Server 301 interacts with one or more additional servers 402, such as e.g. a Location Server or an Address Book Server, in order to execute the required service. One such exemplified interaction is indicated with an optional step 4:6b.

Figure 1:
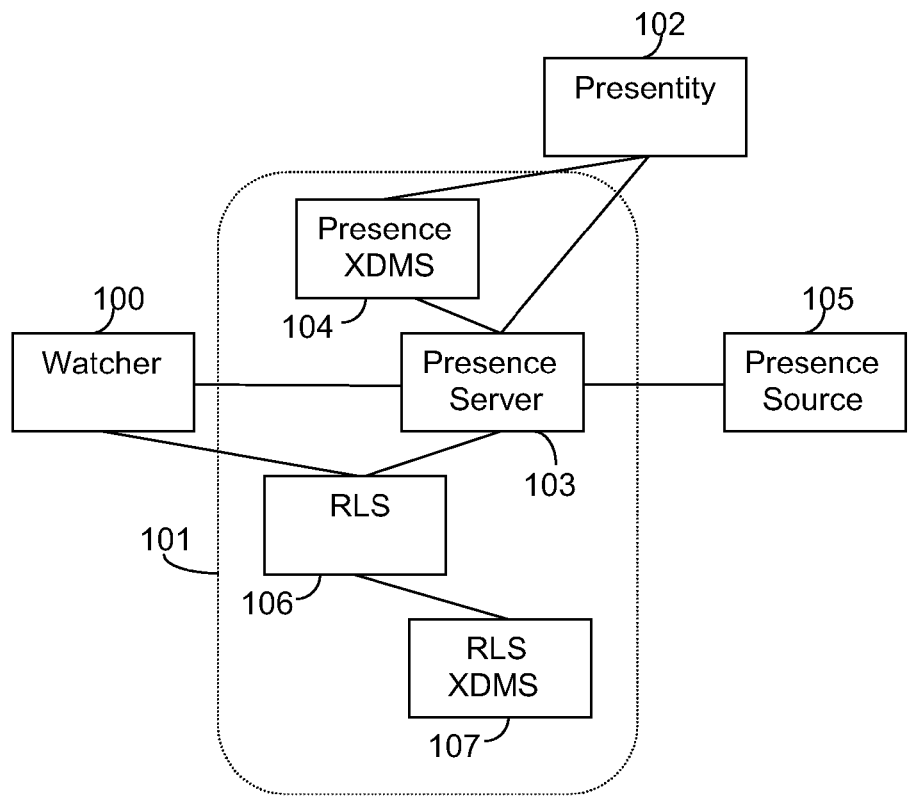
FIG. 1 schematically illustrates a Presence System, according to the prior art.
Figure 3:
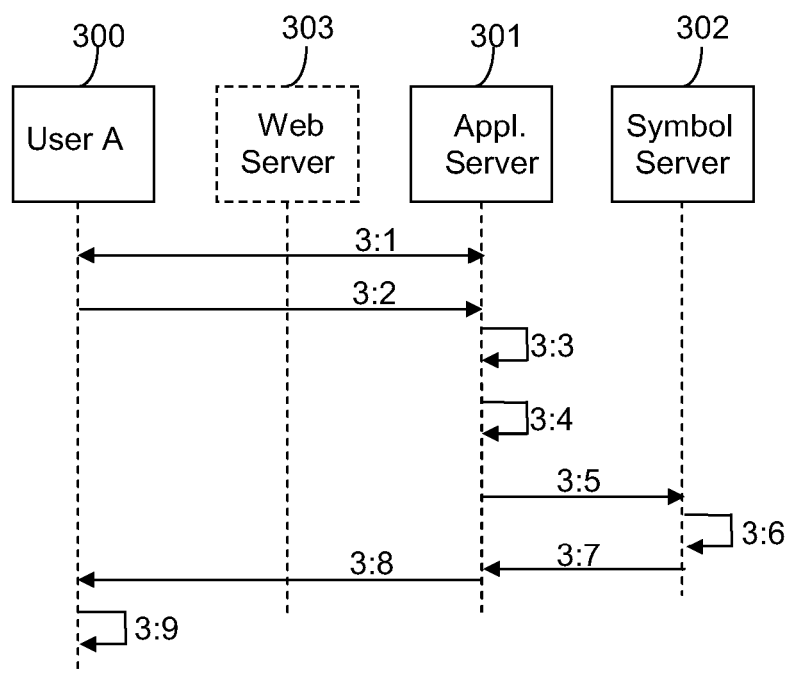
FIG. 3 is a signalling diagram illustrating how a service to be associated with a symbol may be defined by a user, according to one embodiment.

It is to be understood, that the previously defined service, described at stage 3:1 of FIG. 3, may have been defined as a conditional service with regards to a user, or to different user groups. If for example the service is a service which includes the transmission of some information directly from the Application Server to user B via SMS, such a procedure may have to be authorized by User A, before it is executed. Such an optional procedure is indicated in the figure with another step 4:6a.

In subsequent steps 4:7 and 4:8, the result of the service initiated by user B 300 is delivered to one or more destinations, specified when defining the service. In this example the result is transmitted to User B, e.g. as an SMS, an MMS, HTTP or via SIP/IMS.

In case the User Equipment of User B has code generating capabilities, the symbol server functionality will be integrated with the User Equipment, and, thus, step 4:4 will instead be executed as an interaction between the User Equipment 400 and the Application Server 301, typically via an intermediate node providing access to the chosen network. The method described above may be used for a great variety of purposes, all of which may rely on different communication means and different service platforms.

According to one embodiment, a first user having defined a service, retrieves a unique 2-dimensional barcode as a symbol for the service. The service may e.g. represent some personal information of the user which is to be made public to interested, approved parties, thereby simplifying accessibility to this kind of information.

One typical example of personal information suitable for such an implementation is electronic business card information, such as e.g. vCard information. A first user, User A, may have printed out a symbol retrieved from the Symbol Server, and a second user, user B, requiring business card information of User A may have chosen to register the symbol, e.g. with a camera of a cellular telephone, and transmit this symbol to an Application Server, e.g. by dialling the number of the respective service, provided by the Application Server.

Once the respective symbol record has been retrieved by the Application Server, the Application Server executes the service previously defined by user A, i.e. the administrating user, typically by requesting for relevant information from one or more additional Servers, such as the Server, referred to as an Additional Server 402 in FIG. 4.

If, as in this case, the requested information is business card information, the Additional Server 402 may be an Address Book Server, and the information retrieved from the Address Book Server is provided to User B, using any conventional transmission means, possibly after user A has authorized the request, as indicated in step 4:6a of FIG. 4.

By implementing the suggested method for retrieving business card information, or any other type of printed information, the procedure for information exchange may be not only considerably simplified, but also safer, especially since the risk of misspelling the content of printed matter when trying to write down or type it is completely eliminated by using the proposed automated concept.

According to another embodiment, addressing instead a Presence service, a Presentity, which may be represented by User A in FIG. 4, defines a service, e.g. by accessing an Application Server via a web service, and prints out a symbol which has been associated with the service. The symbol is put up on display at a relevant location for other users, i.e. Watchers, to find and to use. When a Watcher, which is represented by User B in FIG. 4, finds the symbol and decides to add User A to its buddy list, User B may register the symbol, e.g. by taking a photograph of it, and send it to the Application Server. The Application Server communicates with the Symbol Server, and optionally, one or more Additional Servers, which altogether may represent a Presence System in order to initiate the symbol triggered service.

Once the symbol has been decoded by the Symbol Server and transmitted to the Application Server, the Application Server can identify the user identity of User A and add this user to, or remove it from, the buddy list of User B on behalf of User B, according to conventional document management procedures.

It is to be understood that symbols associated with presence services may be applicable for a variety of applications.

According to a first scenario based on presence, a conference administrator may want to set up a number of attributes to be used by the participants of an upcoming conference. The administrator may access an Application Server via a web service adapted to provide a variety of options/attributes for managing this type of events. Once attributes, which define e.g. preferred presence settings, has been set by the administrator, a barcode, which will be associated with the attributes will be generated by the Application Server and sent to the administrator, which will be able to reproduce the barcode, e.g. by printing it. The barcode can then be made available to the conference participants, e.g. by distributing it in printed form, e.g. as a mail, or electronically, e.g. as an e-mail, as an SMS, or by exposing the barcode, typically together with a text, explaining the respective service, outside the conference hall. Attendances registering the barcode will then be able to trigger a service, which may be an on-line service, which may comprise e.g. a display attributes selected by the administrator on the display or monitor of a User Equipment of the conference attendant. The attendant may then choose to select to authorize some or all of these attributes.

According to yet another exemplified scenario, which is also based on presence, a user about to enter a train may initiate a subscription to presence information from the transportation company, e.g. by registering a barcode placed on a strategic place of the passenger carriage. Such a registration may typically comprise automatic setting-up of a connection between the user and an Application Server, managing the presence service of the transportation company, allowing the user to enter personal information, such as e.g. the intended destination. By subscribing to the described presence information, the user may be provided with updated presence information associated with the respective train set, such as e.g. information about delays and/or alerts indicating when the train is about to arrive at the station indicated as the users intended destination.

According to yet another embodiment, illustrating how a presence service may be enriched using the suggested symbol associated mechanism, a sticker may be put up outside a shop or in the vicinity of any other building or location, allowing a user to add or remove the identity of the shop, building or location from a buddy list of the user, thereby preparing oneself to receive certain required information, such as, e.g. advertisements, product information, news or sports results. The administrator, e.g. a shop owner, may have defined a general service, providing the same information to any individual, which may choose to select the presence service, or a customized service, allowing the user to connect to a service, wherein the user may be able to select from different options.

By implementing the suggested service defining and triggering mechanism according to the general principles of any of the scenarios mentioned above, an administrator of the service may simplify the use of buddy lists considerably. Using the suggested mechanism in combination with presence may also enlarge the field of use for buddy lists. This way of improving administration of buddy lists may also encourage a more frequent utilisation of presences services among present presence services customers, as well as attract new customers to use this type of services.

According to yet another embodiment, also addressing Presence services, the described concept may instead be used for the purpose of simplifying the publishing or notifying of different kind of presence data. Publishing or notification is triggered by registering a symbol, which has been located e.g. outside a conference room, typically together with a text, explaining the intended purpose with the symbol, i.e. what kind of service that will be triggered by registering the symbol and/or an instruction how to trigger the service. Registering the symbol may initiate a procedure for updating the presence of a user, e.g. when the user is just about to enter or leave a meeting, the user may change its availability from available to busy, and the other way around, in a fast, simple and user friendly way, simply by registering the symbol and by sending the symbol to an application, according to a given instruction.

Utilisation of the suggested triggering concept for publications and/or notification purposes may enable users the possibility both to access and to provide presence information in a simplified manner. The suggested method may also allow users to keep their presence information updated while on the move, requiring a minimum amount of effort both from the Presentity and the Watcher.

The implementation of the described triggering concept will require a new Application Server which will be set to provide the elaborated triggering services, while the GUI/Web service, used for defining a symbol triggered service, may be provided using conventional technique.

Figure 5:
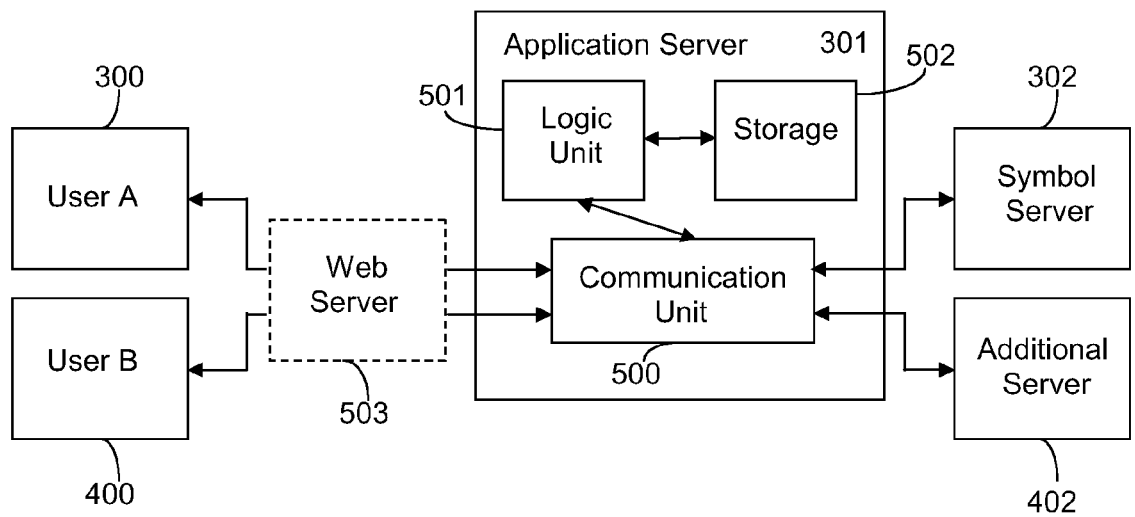
FIG. 5 is a block diagram illustrating an Application Server for managing the definition and triggering of a service associated with a symbol, according to one embodiment.

One way of configuring an Application Server adapted to handle operations associated with a symbol, according to any of the embodiments described above will now be described with reference to FIG. 5.

The figure describes an Application Server 301, which will enhance Presence Server functionality if dedicated for handling presence related services. It is to be understood that only the generic functionality necessary for the understanding of the handling of symbols and associated operations according to any of the embodiments described above is included in FIG. 5, thereby omitting the mentioning of any other conventional and well known functionality which may be necessary for operating an Application Server in a communication network in a conventional manner.

The Application Server 301 comprises a Communication Unit 500, adapted to handle communication with different users, here represented by User A 300 and user B 400, which may define a service, i.e. operations which are to be associated with a symbol, created by the a Symbol Server 302, and/or trigger the performance of the predefined service. User A and B are typically provided with a User Equipment, adapted to communicate with one or more applications of Application Server 301, typically via an intermediate node (not shown), providing access to the Application Server.

The Communication Unit 500 is also adapted to handle the communication with a Symbol Server 302, and, optionally, with one or more additional Servers 402, each of which may be adapted to support the Application Server 301 when performing requested services.

The functionality necessary for performing the method described above may be represented by a generic unit, which may in this case is referred to as a Logic Unit 501. The Logic Unit 501 will be adapted to control the communication with a user and the Application Server 301, when a service is defined via the interactive service defining procedure, as well as when a user is triggering a service to be executed. The Logic Unit 501 also controls the interaction with the Symbol Server 302, and any additional Server 402, necessary for executing a predefined service.

The Logic Unit 501 is adapted to create a symbol identity and to create and store a symbol record as a result of a user having associated a service with a symbol, as well as to retrieve a symbol record whenever a user has triggered a service. The Logic Unit 501 also controls a Storage 502, adapted to store the symbol records.

An administrating user, defining a symbol triggered service, as well as a triggering user may be able to access the Application Server via a Server, typically a Web Server 503, in order to interact with the Application Server when defining a service and when executing a symbol triggered service. The respective User Equipments may also be provided with registering means for registering a symbol associated with a specific predefined service, and at least the User Equipment of the administrator may also be adapted to communicate with an application of the Application Server, which enables a user to define a symbol triggered service.

Figure 6:
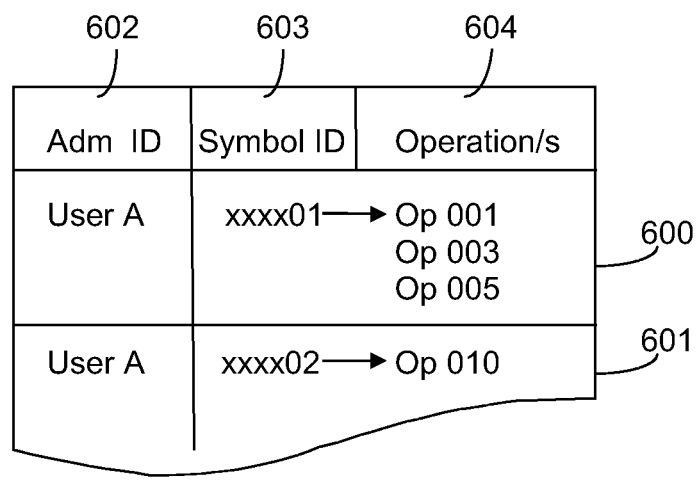
FIG. 6 is an example illustrating two symbol records for storing operations representing user defined services, according to one embodiment.

Although a symbol record may be configured in many different ways, FIG. 6 illustrates one alternative structure, wherein two symbol records 600 and 601 each comprises an adm ID 602, a symbol ID 603, and one or more operation steps 604, associated with the respective symbol ID.

In the present example, a user, User A has defined two services, which are stored in different symbol records, identifiable by symbol ID xxx01 and xxx02, respectively. The service of symbol record 600, identified by symbol ID xxx01 is linking to a set of three operations, i.e. Op 001, followed by Op 003 and Op 005, while the service of symbol record 601, identified by Symbol ID xxx02 is linking to the single operation step, Op 010.

While the invention has been described with reference to specific exemplary embodiments, the description is generally only intended to illustrate the inventive concept and should not be taken as limiting the scope of the invention, which is defined by the appended claims.

The invention claimed is:

1. A method of enabling a service at a communication network node, said method comprising:
   receiving a first request from a first user requesting for one or more operations to be associated with a symbol said request comprising an instruction identifying said one or more operations and an administrator identity identifying said first user as an administrator of the service,
   generating a unique symbol identity,
   creating a symbol record associated with said symbol identity, the symbol record comprising said symbol identity, said one or more operations associated with said symbol identity, and said administration identity,
   associating said symbol identity with said symbol that is created by a symbol server,
   forwarding said symbol to said first user,
   receiving a second request comprising said symbol from an initiator of said second request,
   retrieving the symbol identity corresponding to said symbol from said symbol server,
   obtaining authorization from said first user in order to execute said service, and
   enabling said service by executing said one or more operations according to the symbol record identified by said symbol identity, wherein said service comprises updating a presence of said initiator of said second request.

2. The method according to claim 1, wherein said second request further comprises a user identity, identifying the initiator of the second request, triggering said service.

3. The method according to claim 2, wherein said first user is the same as the initiator of the second request.

4. The method according to claim 1, wherein said instruction is the result of an interaction between an application of the node and a user equipment of the first user.

5. The method according to claim 4, wherein said application is accessible via a WEB server.

6. The method according to claim 4, wherein said interaction comprises interpreting one or more user readable commands entered by said first user into one or more operations, said one or more operations being executable by the node.

7. The method according to claim 1, wherein said second request is transmitted via MMS or SMS.

8. The method according to claim 1, wherein said second request is transmitted via a SIP/IMS based protocol.

9. The method according to claim 1, wherein one service comprises adding said first user to or removing said first user from a list of presence enabled buddies, said list being a buddy list of the initiator of said second request.

10. The method according to claim 1, wherein one service comprises updating the presence of the initiator of said second request.

11. The method according to claim 1, wherein one service comprises executing a publish or a notify command, said command being configured to activate or deactivate publications and/or notifications of presence information of the first user or the initiator of the second request.

12. The method according to claim 1, wherein one service comprises distributing an electronic business card, according to the following steps:
   retrieving electronic business card information specified by the first user from an Address Book Server, and
   providing an electronic business card to the initiator of said second request, said electronic business card being configured according to at least one of said one or more operations.

13. A communication network node for enabling a service, said node comprising:
   at least one microprocessor; and
   a non-transitory computer-readable storage medium, coupled to the at least one microprocessor, further including computer-readable instructions, when executed by the at least one microprocessor, are configured to:
      generate a unique symbol identity, upon having received a first request from a first user requesting for one or more operations to be associated with a symbol said request comprising an instruction identifying one or more operation and an administrator identity identifying said first user as an administrator of the service,
      create a symbol record associated with said symbol identity, the symbol record comprising said symbol identity, said one or more operation associated with said symbol identity, and said administration identity,
      associate said symbol identity with said that is created by a symbol server, and to forward said symbol to said first user,
      receive a second request comprising said symbol from an initiator of said second request;
      retrieve the symbol identity corresponding to said symbol from said symbol server, to obtain authorization from said first user in order to execute said service, and
      provide said service by executing said one or more operations according to the symbol record identified by said symbol identity, wherein said service comprises updating a presence of an initiator of said second request in said service.

14. The communication network node according to claim 13, wherein the computer-implemented instructions are further configured to:

provide an interaction between an application of the node and a User Equipment of said first user, said interaction having the purpose of resulting in said instruction.

15. The communication network node according to claim 14, wherein said application is accessible via a WEB server.

16. The communication network node according to claim 14, wherein said application is adapted to interpret one or more user readable commands entered by said first user into one or more operations, said one or more operations being executable by the node.

17. The communication network node according to claim 13, wherein the computer-implemented instructions are further configured to:
receive said second request via a SIP/IMS based protocol.

18. The communication network node according to claim 13, wherein the computer-implemented instructions are further configured to:
receive said second request via SMS or MMS.

19. The communication network node according to claim 13, wherein the computer-implemented instructions are further configured to:
enable a service having the purpose of adding said first user to or removing said first user from a list of presence enabled buddies, said list being a buddy list of the initiator of said second request.

20. The communication network node according to claim 13, wherein the computer-implemented instructions are further configured to:
enable a service having the purpose of updating the presence of the initiator of said second request.

21. The communication network node according to claim 13, wherein according to at least one of said one or more operations the computer-implemented instructions are further configured to activate a publish or notify command, said command being configured to activate or deactivate publications and/or notifications of presence information of the first user or the initiator of said second request.

22. The communication network node according to claim 13, wherein the computer-implemented instructions are further configured to enable a service having the purpose of distributing an electronic business card to the initiator of said second request.

23. The communication network node according to claim 22, wherein the computer-implemented instructions are further configured to retrieve electronic business card information specified by the first user from an Address Book Server, and to provide an electronic business card to the initiator of said second request, said electronic business card being configured according to at least one of said one or more operations.

24. The communication network node according to claim 13, wherein communicate with said first user and/or the initiator of said second request via SMS or MMS.

25. The communication network node according to claim 13, wherein said node is an application server.

26. The communication network node according to claim 25, wherein said application server comprises presence functionality.

* * * * *

UNITED STATES PATENT AND TRADEMARK OFFICE
CERTIFICATE OF CORRECTION

PATENT NO. : 8,843,570 B2  
APPLICATION NO. : 12/867934  
DATED : September 23, 2014  
INVENTOR(S) : Klein et al.

Page 1 of 1

It is certified that error appears in the above-identified patent and that said Letters Patent is hereby corrected as shown below:

In the Specification

In Column 8, Line 2, delete "user B 300" and insert -- user B 400 --, therefor.

Signed and Sealed this
Twenty-first Day of April, 2015

Michelle K. Lee
*Director of the United States Patent and Trademark Office*